Sept. 3, 1968 W. P. LEAR ET AL 3,400,227

COMBINED RADIO AND MAGNETIC TAPE PLAYER

Original Filed Aug. 26, 1964 2 Sheets-Sheet 1

INVENTORS
WILLIAM P. LEAR,
SAMUEL H. AULD.
By R. A. [signature]
Their ATTORNEY

COMBINED RADIO AND MAGNETIC TAPE PLAYER

Original Filed Aug. 26, 1964

INVENTORS
WILLIAM P. LEAR,
SAMUEL H. AULD.
By R. A. Marsen
Their ATTORNEY

United States Patent Office 3,400,227

Patented Sept. 3, 1968

3,400,227

COMBINED RADIO AND MAGNETIC TAPE PLAYER

William P. Lear, Wichita, Kans., and Samuel H. Auld, Bloomfield Hills, Mich., assignors to Lear Jet Industries, Inc., a corporation of Delaware Original application Aug. 26, 1964, Ser. No. 392,212. Divided and this application Oct. 11, 1965, Ser. No. 494,647

5 Claims. (Cl. 179—100.11)

ABSTRACT OF THE DISCLOSURE

The player accommodates cartridges with their tape in self-contained array. The tape is exposed for direct coaction with the tape drive capstan and the transducer. The cartridge is insertable in an opening of the player for such tape play relation. A radio tuner circuit is associated with the player. A circuit switch is arranged for abutment with the cartridge to energize the tape drive to transport the tape in play. The radio tuner is connected into circuit play relation by the switch when the cartridge is withdrawn, which deenergizes the tape drive at the same time.

This invention relates generally to player systems for magnetic tape cartridges, and more particularly to novel combination radio and cartridge player units for automobiles and other vehicles as well as for the home. This is a division of patent application for "Combination Radio and Magnetic Cartridge Player," Ser. No. 392,212, filed on Aug. 26, 1964, and assigned to the assignee hereof.

Record players for vehicles should preferably be simple to operate and require a minimum of handling or attention by the driver. Disc records have been tried in automobiles without success because of the bumps and turns in riding. Magnetic tape recordings overcome needle bounce, but have heretofore been relatively complex to play on the road. Further, the associated player equipment was bulky, and not convenient for automobile or private plane use.

In accordance with the present invention the magnetic tape is used as individual reels in endless array, each within a cartridge. Quality stereophonic or monaural music, hours in length, is recordable on each such reel, within a cartridge that is light in weight and smaller in size than a pocket paperback book. The player hereof contains a slot or opening into which the cartridge is inserted for play. The combination radio-player of this invention effectively integrates a car radio, the magnetic tape drive and tracking mechanism, and amplifier circuits, into an efficient, compact unit.

The invention radio-player hereof can readily be fitted behind the dashboard of an automobile, in the space and position of the usual radio alone. The radio and player controls are all directly accessible to the car driver. The slot into which the cartridge is inserted for play is positioned adjacent to the radio tuning dial. Full insertion of the cartridge effects its latch-in and playback, automatically. Its full or partial release permits radio play through the common amplifier-speaker set-up in the car. The cartridge region within the chassis is proportioned and arranged to closely fit about the cartridge, to guide it into the operative position. When its end reaches thhe capstan or a preset stop, a retention roller grips the cartridge to firmly hold it in precise play relation, and the drive and play circuits become energized. Track advancement is automatically performed at the end of the previous one; or manually by push-button at the dashboard controls.

The aforesaid features, advantages, and objects of the present invention will become more apparent from the following description of an exemplary embodiment thereof, illustrated in the drawings, in which.

Figure 1:
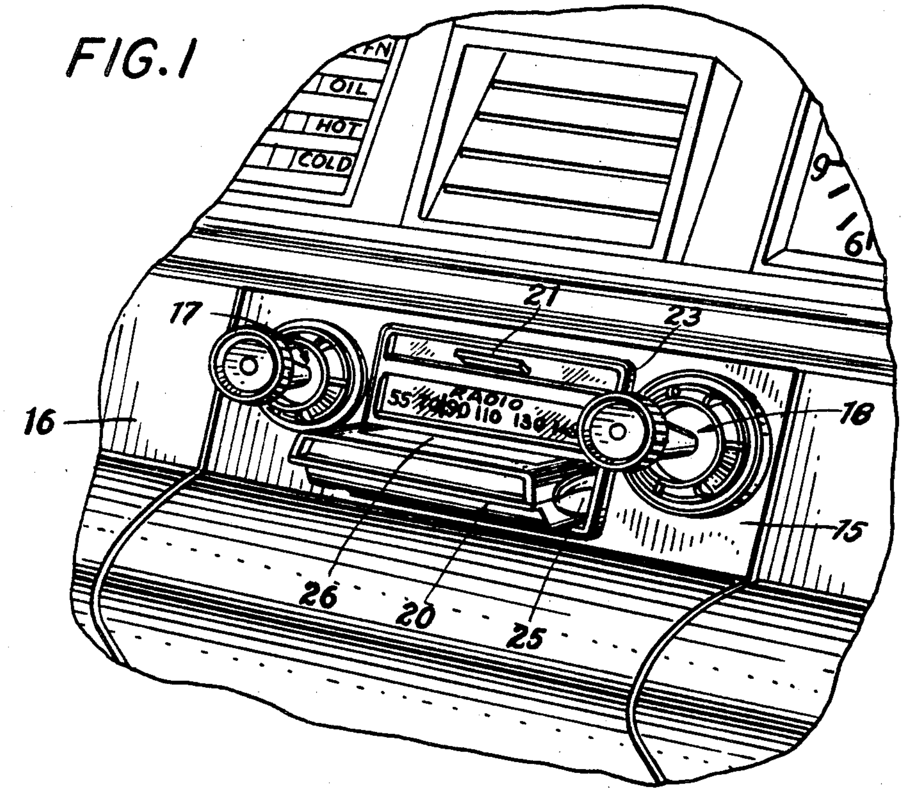
FIG. 1 is a perspective illustration of the exemplary radio-player installed in an automobile dashboard, with a cartridge inserted in play position.
Figure 2:
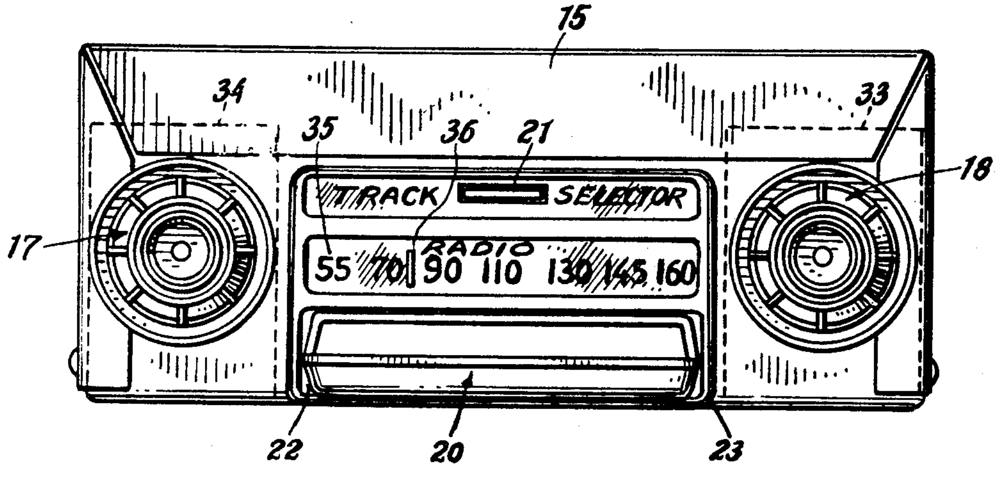
FIG. 2 is the front view of the radio-player of FIG. 1.

Referring to the figures, the radio-player unit 15 is arranged to be readily mounted behind the dashboard 16 of an automobile. It is compact, integrated, and efficient in construction and accessibility, in accordance with the present invention. The unit is controlled through two knob sets 17 and 18, as well as the position of a cartridge 20 positioned within it. While the knob control arrangement is optional, their functions in the exemplary system are: (a) on-off overall switch, and volume setting (by the front knob of left set 17), and (b) tone control (by the back one); (c) radio station selection or tuning (by the front knob of right set 18), and (d) stereophonic balance among the speakers (by the back one). System control by the cartridge 20 position, and the track selector switch 21, will be set forth in detail hereinafter.

The magnetic tape cartridge 20 is shown in the "play" position, pressed into its innermost place within the radio-player unit 15. The cartridge fits through an opening or slot 22 in the front bezel 23 and space 24 within the unit 15, therefor. The cartridge 20 contains a finger grip 25, 25 near its front, at each side for its convenient insertion and removal. A transverse groove 26 adjacent the top front of the cartridge further facilitates its handling. Cartridge 20 is firmly and stably held in "play" position by retention roller 27 pressed into a notch 28 integrally formed in its side, by leaf spring 29. Physical details of the cartridge are shown and described in the copending patent application of William P. Lear for "Magnetic Tape Cartridge," Ser. No. 393,083, filed on Aug. 31, 1964, now Patent No. 3,350,025 and assigned to the same assignee.

Figure 4:
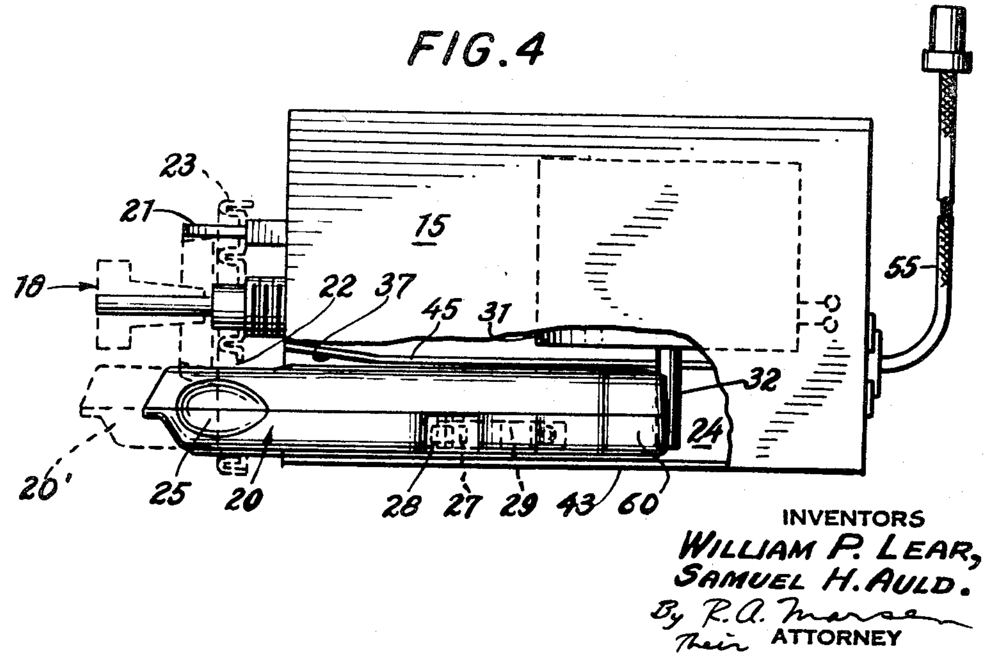
FIG. 4 is a side view of the exemplary radio-player, partially cut-away to show the cartridge therein.

The structural compactness of unit 15 is rendered feasible, in part, by the use of transistors and small circuit components for the amplifiers and the contained motor speed control circuit. Further, the direct motor drive 31 of the magnetic tape 30 of cartridge 20, by capstan-shaft 32, see FIG. 4, materially reduces the number of mechanical components and requisite space therefor.

The radio tuner-detector module 33 is fitted along one side of the chassis unit 15; the stereo dual-signal amplifier 34 along the other side. The sizable drive motor 31, and head track shift mechanism (not shown), are located in the space between the circuit sections 33, 34. The remaining circuit elements are readily arranged within the unit 15. The radio dial 35 is central, linear and horizontally disposed. A station indicator 36 moves across dial 35. The cartridge slot 22 is elongated and parallel across the radio dial 35. The handling of cartridge 20 centrally of the unit 15, and adjacent the radio dial, affords direct and convenient control of radio and record play while riding. Both the radio 35 and the tape cartridge 20 are directly controlled by simply reaching out with one's right hand.

The magnetic tape cartridge 20 is picked up by thumb and forefinger across grip cavities 25, 25 or at top groove 26 and front-bottom. The cartridge is inserted through slot 22. The frontal portion 37 of an upper plate is tilted upwardly at an angle to facilitate cartridge insertion into the unit 15. When fully inserted, a corner 40 of the cartridge front section is pressed against a stop 38, the retention roller 27 snaps into notch 28. The stop 38 is adjustable through nut 39 on a fixed post. This predetermines the play-position of the magnetic tape 30 with the capstan 32 and the pick-up head 41. Towards this end, a side-guide 42 is arranged parallel to the cartridge 20, in the unit 15, very close to the cartridge when it is inserted. The use of a stop 38 is optional, as the press of the cartridge roller 50 against the capstan 32 provides a satisfactory stop function. The cartridge is held in practical play relation through retention roller 27, with tape 30 in play position with transducer head 41, and transversely moved by the capstan-roller array.

Figure 3:
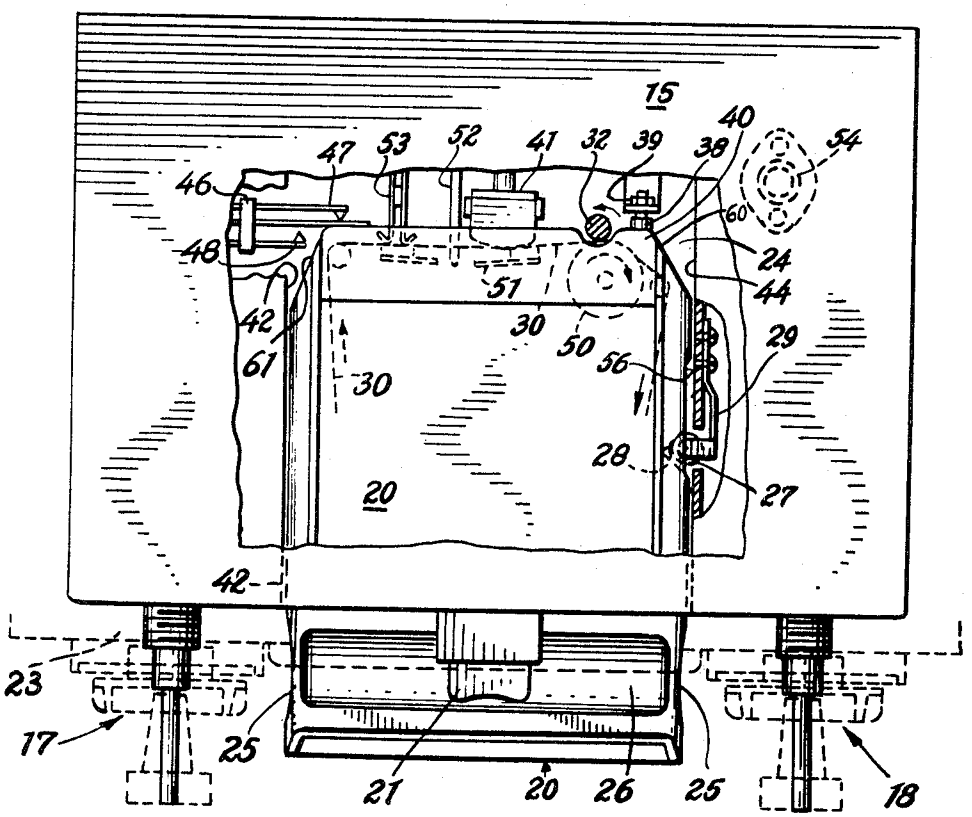
FIG. 3 is the top view of the radio-player of FIGS. 1 and 2, cut-away to show its interior components in coaction with the inserted cartridge, in play position.

The open space 24 for the cartridge is formed by chassis base 43, the side guide 44 on which roller 27 is mounted, the guide 42, and the upper plate 45 that contains lip 37. The spacing between parallel side guides 42 and 44 is a small amount more than the width of the cartridge. In the exemplary player such width, internally between side guides 42, 44 is just .030" more than the 4.0" cartridge width. The latched-in cartridge, by roller 27, as shown in FIG. 3, is thus held in a predetermined orientation within space 24. The closely pressed guide 42 holds it in parallel position; the capstan 32 and/or stop 38, in precise inward location. The roller 27 retains the cartridge firmly and stably in this "play" position, even during tough travel conditions, including bumps along the road.

When the cartridge 20 is in the "play" position, the selection switch 46 is closed upon its outer tape-play contact 47, as shown in FIG. 3. With the "on" switch actuated by its knob (at 17), the closure of contact 47 energizes the circuits for the motor 31 drive and the magnetic tape reproduction in a suitable manner as understood by those skilled in the art. When the cartridge is in its "ready" or "hold" position, shown at 20' in dotted lines in FIG. 4, the switch 46 is closed on its lower contact 48 for radio-play operation.

The capstan 32 presses against the contained pinch roller 50 with the tape 30 therebetween. Rotation of capstan 32 by motor 31 transports the tape longitudinally across head 41, pressed thereto by a pad 51. The tape 30 is on a reel (not shown) in the cartridge 20, in endless configuration, as in the patent aforesaid. A tape guide 52 projects across the tape 30 to hold it at a fixed height, as a reference for the track shift mechanism for head 41, within the unit. Such mechanism is shown in our copending patent application for "Track Shifting Mechanism for Magnetic Tape," Ser. No. 392,213, filed on Aug. 26, 1964, and assigned to the same assignee. The head 41 is shifted successively, laterally of the tape, track by track, upon actuation of contacts 53 by a suitable conductive patch on the tape at its track end/start recording region as shown in the latter patent application.

The radio antenna lead is suitably plugged-in at connector 54. The external connections to unit 15 are made by a cable 55, to the battery, and the loudspeakers. The magnetic tape 30 plays when the cartridge is in the "play" position within unit 15, as shown in solid lines in the figures, when the set-switch is "on" at 17, as aforesaid. It plays, track-after-track, automatically; being manually shiftable, at option, through track selector switch 21 that over-rides the contactor 53 in the manner set forth in the latter referred to patent application.

The cartridge 20 is held in readiness-to-play in unit 15, when its auxiliary notch 56 is engaged with retention roller 27. This occurs when the cartridge is in the dotted position 20' shown in FIG. 4. The selector switch 46 thereupon closes at contact 48 to circuitally effect radio-play. The roller 27 prevents cartridge 20 from slipping out of unit 15 when in the readiness position 20'. Tape record-play is quickly accomplished by simply pressing the cartridge full-in, to the solid position 20, as will now be understood. Cartridge replacement is readily performed through the finger grips 25, 25 and 26.

An inclined corner or ramp 60 of the cartridge 20 engages retention roller 27 as it is inserted through the slotted opening 22. The ramp 60 is proportioned to cause the roller 27 to ride onto and along the side of the cartridge, and thereupon engage the notch 56 or 28. The ramp 60 is important for this purpose for the easy use and direct manipulation of the tape cartridge 20 in the player system 15. A second inclined corner 61 is symmetrically located on the left side of the cartridge 20 opposite ramp 60. The cartridge not only appears more esthetic therewith, but both forward corners 60, 61 inclined in this manner facilitate the insertion of the cartridge into the slotted opening 24 of the player with a minimum of concentration and handling. The magnetic tape cartridge-player system of this invention is as readily operated as is the accompanying radio. Either the radio or the cartridge-player hereof is directly reached, controlled and used, with one hand, even while driving the automobile.

Although the present invention has been described in connection with an exemplary embodiment, changes and modifications may be made within the broader spirit and scope of the invention, as set forth in the following claims.

We claim:

1. A combined radio and magnetic tape player for a cartridge containing a reel of tape in endless array with an exposed portion for coaction with the player, said player comprising a chassis, magnetic tape drive means supported in the chassis including a capstan, a pick-up head, and a retention member for stably positioning and holding the cartridge in full play coaction with the tape drive capstan and pick-up head; said capstan and pick-up head being positioned at the interior end of a tunnel opening in the chassis for pressing against the exposed tape portion of the cartridge when inserted and held in the tunnel; said retention member being mounted at the side of the tunnel opening that is nearer said capstan and at a predetermined longitudinal distance from said capstan, said retention member being biased into the tunnel for engaging with the cartridge at its corresponding side when inserted therein; a side guide at the tunnel opening located opposite its first said side; said retention member being arranged for displacement by the catridge upon its insertion in the tunnel and for engaging the cartridge at a recessed region in its said corresponding side that contains an inclined surface, said retention member thereupon coacting with said recessed inclined surface to develop a substantial forward force on the cartridge to press its exposed tape portion into play relation with said pick-up head and into firm tape drive relation with said capstan, and simultaneously develop a lateral force on the cartridge that holds it in stable relation against said side guide, in the play mode in the player; said radio including radio receiving circuit means; and circuit switch means for selectively connecting with said tape drive means and said radio receiving circuit means, said circuit switch means being arranged for abutting coaction with said cartridge to electrically connect said tape drive means into its operable mode and drive the magnetic tape when the cartridge is positioned and held in its play mode in the player, said circuit switch means being arranged to electrically connect said radio circuit means into its operable play mode and simultaneously electrically disconnect said tape drive means when said switch means is out of abutment with the cartridge.

2. A combined radio and magnetic tape player as claimed in claim 1, in which a second region in the cartridge located adjacent to its said recessed region is coactable with said retention member for stably holding the cartridge in the chassis out of tape play relation and out of abutment with said circuit switch means, whereby said tape drive means remains in its unenergized mode and said radio receiving circuit means is in electrical connection in its operable play mode.

3. A combined radio and magnetic tape player for a cartridge containing a reel of tape in endless array, comprising a chassis; radio circuit means, a magnetic tape drive, and transducer means contained in said chassis;

retention means arranged at an opening in the chassis for stably positioning and firmly holding the cartridge in its tape play mode upon its full insertion in the said opening against said tape drive and transducer means; and a circuit switch means for selectively connecting with said tape drive and said radio circuit means, said circuit switch means being arranged for abutting coaction with said cartridge for electrically connecting said tape drive into its operable mode when the cartridge is positioned and held in its said tape play relation and thereby drive the magnetic tape in its play mode, said radio circuit means being energizable through said switch to operate the radio in play when the cartridge is out of the said tape play position and out of abutment with said switch, said tape drive being electrically disconnected thereby and stopped.

4. In combination: a magnetic tape player for a cartridge having its tape in self-contained array with portions exposed for transport and transcription comprising a chassis, tape drive means and a transducer mounted with said chassis; retention means arranged to firmly hold the cartridge with its exposed tape portions in play coaction with said drive means and said transducer upon insertion of the cartridge in the player; radio circuit means; and circuit switch means for selective connection with said drive means and said rado circuit means; said circuit switch means being actuated by said cartridge insertion in the player to electrically connect said tape drive means into its operable mode and thereby transport the magnetic tape and effect its transcription by said transducer; said radio circuit means being energizable through said switch means to operate the radio in play when the cartridge is removed from its said tape play coaction, whereupon said tape drive means is electrically disconnected by said switch means and thereby stopped.

5. In combination: a magnetic tape player for a cartridge having its tape in self-contained array with portions exposed for transport and transcription comprising a chassis, tape drive means and a transducer mounted with said chassis; retention means arranged to firmly hold the cartridge with its exposed tape portion in play coaction with said drive means and said transducer upon its insertion in the player; circuit switch means for selective connection with said drive means and a radio circuit; said circuit switch means being actuated by said cartridge insertion in the player to electrically connect said tape drive means into its operable mode and thereby transport the magnetic tape and effect its transcription by said transducer; the radio circuit being energizable through said switch means to operate the radio circuit in play when the cartridge is removed from its said tape play coaction, whereupon said tape drive means is electrically disconnected by said switch means and thereby stopped.

References Cited

UNITED STATES PATENTS

| | | | |
|---|---|---|---|
| 2,804,508 | 8/1957 | Mastling | 179—100.2 |
| 2,911,215 | 11/1959 | Cousino | 179—100.2 |
| 2,914,620 | 11/1959 | Dale | 179—100.2 |
| 3,083,269 | 3/1963 | Gaubert | 179—100.2 |
| 3,311,316 | 3/1967 | Williams | 179—100.2 |
| 3,285,526 | 11/1966 | Moore | 179—100.2 |

BERNARD KONICK, *Primary Examiner.*

H. STECKLER, *Assistant Examiner.*

Disclaimer 3,400,227.—*William P. Lear*, Wichita, Kans., and *Samuel H. Auld*, Bloomfield Hills, Mich. COMBINED RADIO AND MAGNETIC TAPE PLAYER. Patent dated Sept. 3, 1968. Disclaimer filed Nov. 24, 1971, by the assignee, *Gates Learjet Corporation.*

Hereby disclaims the portion of the term of the patent subsequent to Oct. 31, 1984.

[*Official Gazette January 25, 1972.*]